United States Patent [19]

Cohen

[11] 4,274,754

[45] Jun. 23, 1981

[54] DOUBLE LOCKING DEVICE

[75] Inventor: Murray Cohen, Seaford, N.Y.

[73] Assignee: Grumman Aerospace Corporation, Bethpage, N.Y.

[21] Appl. No.: 89,771

[22] Filed: Oct. 31, 1979

[51] Int. Cl.[3] .............................................. F16D 1/00
[52] U.S. Cl. ..................................... 403/14; 403/317; 403/320
[58] Field of Search ................ 403/320, 319, 46, 343, 403/118, 316, 317, 318, 13, 14; 151/29, 24, 4, 41.76, 46

[56] References Cited

U.S. PATENT DOCUMENTS

| | | | |
|---|---|---|---|
| 2,821,419 | 1/1958 | Walton | 403/319 |
| 3,736,010 | 5/1973 | Larkin | 403/104 |
| 3,989,394 | 11/1976 | Ellis | 403/320 X |
| 4,042,306 | 8/1977 | Murray | 403/320 X |
| 4,092,080 | 5/1978 | Bradley, Jr. | 403/319 |

Primary Examiner—Andrew V. Kundrat
Attorney, Agent, or Firm—Richard G. Geib; Mellor A. Gill

[57] ABSTRACT

In a coupling of members subject to rotational uncoupling forces, a lock key that unites the members and holds them from relative rotational movement with a fastener for the lock key to not only secure the lock key to one or the other members, but by its size insure proper locking with the lock key of the members.

7 Claims, 3 Drawing Figures

DOUBLE LOCKING DEVICE

RELATED PATENT

This invention is an improvement of my co-pending Patent Application Ser. No. 930,498, filed Aug. 3, 1978.

BRIEF SUMMARY

Most military and commercial aircraft utilize combinations of bellcranks, push/pull rods, bungees (spring loaded pushrods) and hydraulic actuators to operate flight controls and landing gear systems. Since bungees and hydraulic actuators have a tendency to produce relative rotary motion during operation, system integrity has frequently depended upon anti-rotation locking devices to prevent such motion. Those skilled in the art use standard parts per the National Aerospace Standards Committee's Classifications, NAS 513, NAS 559 and NAS 1193. The U.S. Government has also established a standard part designation; i.e., Military Specification Sheet, MIL-B-81935/3 for such also.

Unfortunately, such standard parts have recently shown themselves to be possible of faulty assembly, and most certainly, not fail safe. It has been reported that over one-third of aircraft inspected, as are covered by the above standards, were improperly assembled, and over one-fourth of these were critical linkages. A disconnect of only one of the above standards could have caused a loss of linkage from pilot to control members. The consequence of such a failure could result in uncontrollable flight or an uncontrollable landing, and possibly the subsequent loss of an airplane. An article entitled, "Don't Assume, Be Sure", written by T. Graziano, Mech. Spring, 1978, pp. 12–15, describes the limitations of the standard locking devices currently being used.

It is in this environment, that this invention, the Double Locking Device, finds particular utility, as is possible upon an understanding of said invention, to implement fail safe features in critical flight controls and landing gear linkages.

DRAWING DESCRIPTION

With reference now to the sheets of drawings of the disclosure of this invention:

DETAILED DESCRIPTION

Prior Art

For several years now, the problem of securing actuator rod end to control system connections has been in compliance with the aforesaid standards. This was required because of the tendencies of actuators and bungees to operate with a rotational component that, without locking devices such as provided by following the aforesaid standards, could uncouple the actuator or bungee from the control system.

These standards attempted to preclude human error of installation by providing tabs, slots and grooves to integrate the connection means and locking devices. What was found to be overlooked was the problem of "forced assembly"; i.e., an assembly of the elements such that the tabs and slots are out of registry when facing each other, or when the tab is facing opposite of the slot.

Figure 1:
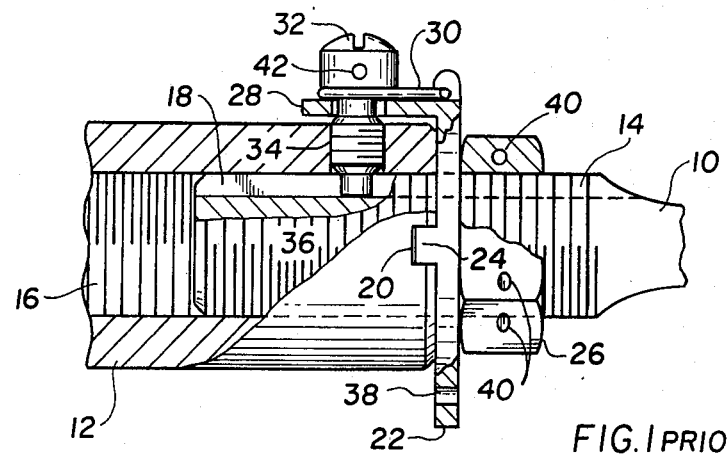
FIG. 1 is a partially cross-sectioned side view of a male rod end connection employing a double lock of prior art construction.

One may ask how can such happen and go unchecked. To explain this, reference is made to FIG. 1, where a rod end terminal 10 is to be joined to a collar 12 as by mating threaded portions 14 and 16. As seen, the terminal 10 has a groove 18 and the collar 12 has four equidistant slots, one of which (20) is shown facing the terminal 10. Also a lock key 22 is fitted over the threaded end 14 so as to be spaced from collar 12 during assembly of terminal 10 and collar 12. The lock key 22 has a tab 24 extending from its body to be insertable in slot 20. The lock key 22 has a shelf 28 that extends over collar 12. A retainer spring 30 mounts a dog screw 32; such that, when the lock key 22 is flush with the end of collar 12, the dog screw 32 may be threaded into a bore 34 of collar 12 with dog 36 within groove 18. It is so positioned whenever the terminal and collar have been adjusted to a proper length, whereupon jam nut 26 is wrenched up to hold the lock key 22 in such locking attitude. Thereafter, a safety wire (not shown) is drawn through holes 38, 40 and 42 of key 22, jam nut 26 and dog screw 32 and tightened (twisted) to secure the lock structure.

This assembly of structure is more particularly described in my patent aforesaid and would appear to dictate that there was no possible way that connections using same will be other than locked and secured. However, it has been found that one may, following improper procedures, install key 22 and tighten jam nut 26 under shelf 28 such that tab 24 is not in a slot 20.

The seriousness of this problem is readily seen when one can appreciate that even a light airplane uses over seventy (70) applications of these locking devices. In one such airplane studied, forty (40) of the applications can be considered to affect safety of flight.

INVENTION

With this in mind, this invention discloses improvements to this locking device to preclude the possibility of reverse assembly to the lock key by providing a jam nut that will not fit under the shelf of the lock key. Stated another way, the unique feature to be observed by those skilled in the art as a result of this disclosure is that the locking device of this invention, the lock key 22' of FIG. 2, cannot be reversed so that the shelf 28' will allow jam nut 26' to be tightened thereunder.

Figure 2:
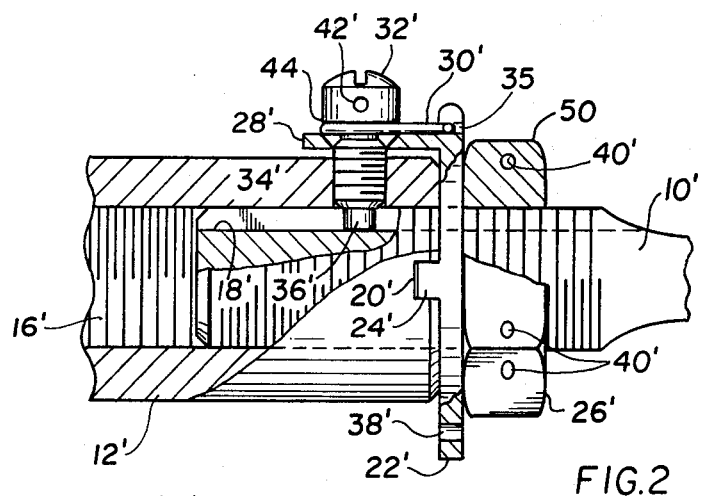
FIG. 2 is a partially cross-sectioned side view of a rod end connection employing a double lock with fail safe features according to this invention.

With reference specifically to FIG. 2, the collar 12' is shown to be joined with rod end terminal 10'. This connection is locked by means of the lock key 22' which has a groove tab (not shown) and slot tabs, one of which 24' is shown, that in cooperation with a groove, 18' in terminal 12', and slots 20' in collar 12', will prohibit relative rotation of collar 12' and terminal 10'. In the embodiment of FIG. 2, the key 22' has a shelf 28' that extends back over the collar 12'. The shelf is bored to provide a countersink hole 52 at a predetermined location that is chosen to be aligned over a tapped bore 34' in collar 12' when and only when key 22' is assembled so that tabs 24' are bottomed in the slots. A shoulder 35 is provided on the shelf behind the bores in the ears 58 and 60 to limit rearward rotation of spring retainer 30'. A dog screw 32' held by spring retainer 30' is then threaded into the tapped bore 34' with its dog 36' bottomed in groove 18' prior to head 44 bottoming the spring retainer 30' on shelf 28'. The threaded portion 45 extends into the countersink hole 52 to prevent slop in fitting key 22' to the collar 12'. Thereafter, the jam nut 26' (actually jam nut 26' could be used to locate key 22' prior to dog screw assembly) is tightened about terminal 10' to bear against the key 22' and bottom it on the face of collar 12'. A safety wire is next assembled as above indicated.

The dimensioning of the slots for tabs 24' is chosen so that dog screw 32 cannot be inserted unless 24' is bottomed in the slots of the face of the collar 12'. The countersink hole is dimensioned to permit the angular insertion of the dog screw. It is not, therefore, possible to insert the dog screw with improper assembly of the key. As one may readily appreciate, more slots in the face will permit finer adjustment of the length of the collar/terminal assembly. If such be done, then the number of tapped holes 34' will have to also be increased. This, however, is limited to the diameter and thickness of the collar that will permit more than one hold, for example, at no sacrifice to structural integrity.

The shelf 28' of lock key 22' is to be manufactured such that it will preclude reverse assembly of the lock key; i.e., the dimension of the undersurface of shelf 28' will be less than that across a peripheral edge 50 of jam nut 26'. This intentional innovative interference of jam nut 26' and the shelf 28' serves as one more positive deterrent to misassembly and further insures proper installation and use of the double locking device.

Figure 3:
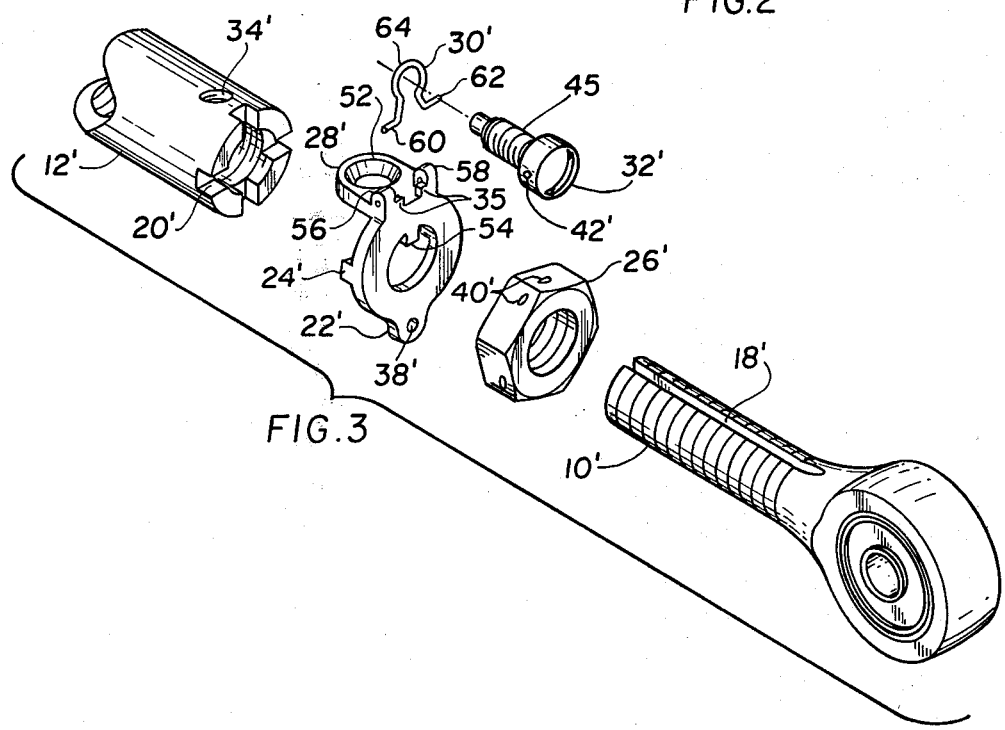
FIG. 3 is an isometric exploded view of the structure of FIG. 2.

With reference to FIG. 3, the preferred structural combination is shown that uses a lock key 22' having a right angle shelf 28', a countersink hole 52, a groove collar tab 54 and slot tabs (24' being shown) and integral bored ears 56 and 58. The retainer spring 30' (see FIGS. 1 and 2) is formed to have fingers 60, 62 and an annular portion 64 of an internal diameter to rotatingly hold a dog screw 32' when fingers 60 and 62 are in the bores of ears 56 and 58, as shown by FIG. 2. The assembly is absent safety wiring through holes 38', 40' and 42' which is the last step of the assembly process.

I claim:

1. Means to double lock a connection, said means comprising:
   a first part to be used in the connection;
   a second part to be joined with the first part in making the connection;
   a lock key to be interposed with said first part and said second part, said lock key having a shelf to extend over one of said first part or said second part;
   a jam nut to locate said lock key, said jam nut having a peripheral surface of a predetermined diameter which is greater than the internal diameter prescribed by the shelf; and
   a dog screw insertable through the shelf to said first part or said second part whichever lies thereunder, to secure said lock key.

2. A positive locking device comprising:
   a male member having a threaded extension that is longitudinally grooved;
   a female member having a threaded bore to receive said male member, said female member having a face about said threaded bore that is provided with a plurality of slots of a predetermined depth and at least one tapped hole a predetermined distance back of said face open to said threaded bore;
   a lock key about said male member and oriented thereto by a groove tab depending from the lock key, said lock key having at least one slot tab of a predetermined extension to bottom in at least one slot in the face of the female member when the lock key is flush on the face, said lock key further having a shelf extending over the female member with a countersink hole therethrough to be aligned with said tapped hole when flush with the face as aforesaid;
   a dog screw adapted to be presented to said tapped hole by insertion through the counterbore of said lock key, said dog screw having beneath a threaded body a dog of a predetermined length that will prevent threading into said tapped hole unless said male member has its groove under said hole and such as to bottom in the groove before binding on the shelf of the lock key; and
   a jam nut on said male member that upon tightening towards the lock key will hold the lock key flush to the face of the female member, said shelf of said lock key being sized to clear said female member but not a peripheral surface of said nut whereby the shelf will not permit tightening of the jam nut against the lock key under the shelf.

3. The device of claim 2 wherein the female member is a rod and the male member is a rod end terminal.

4. The device of claim 2 wherein the lock key has ears to support ends of a retainer spring rotatably holding the dog screw.

5. The device of claim 4 wherein the ears have facing shoulders to limit backward travel of the retainer spring to prevent interference of dog screw and retainer spring with wrench when tightening jam nut.

6. The device of claims 2, 4 or 5 wherein the threaded body of the dog screw extends into the countersink hole to position and hold the shelf relative to the female member.

7. The device of claims 2, 3, 4, or 5 wherein the dog screw, lock key and jam nut are safety wired.

* * * * *

UNITED STATES PATENT AND TRADEMARK OFFICE
CERTIFICATE OF CORRECTION

PATENT NO. : 4,274,754
DATED : June 23, 1981
INVENTOR(S) : Murray Cohen

It is certified that error appears in the above-identified patent and that said Letters Patent are hereby corrected as shown below:

Between lines 1 and 4 insert:

GOVERNMENT LICENSE

The Government has rights in this invention pursuant to Contract No. N00019-76-C-0212 awarded by the Department of the Navy.

Signed and Sealed this

Tenth Day of November 1981

|SEAL|

*Attest:*

*Attesting Officer*

GERALD J. MOSSINGHOFF

*Commissioner of Patents and Trademarks*